March 2, 1971     F. C. STEPANICH     3,567,233

GASKET MEANS FOR PIPE

Filed July 11, 1968

INVENTOR.
Fred C. Stepanich

BY

ATTORNEY

United States Patent Office 3,567,233
Patented Mar. 2, 1971

3,567,233
GASKET MEANS FOR PIPE
Fred C. Stepanich, R.R. 1, Cherryvale, Kans. 67335
Filed July 11, 1968, Ser. No. 744,040
Int. Cl. F16j 15/02; F16l 21/02
U.S. Cl. 277—177                                  6 Claims

ABSTRACT OF THE DISCLOSURE

A flexible, resilient gasket for the joints of concrete or pipes made of other material includes a chevron portion and an extending sleeve which is rolled up and compressed between the spigot end and bell end of a pipe joint making a fluid tight joint.

Bell and spigot pipe joints are used for concrete pipe, as well as pipe made from other materials such as cast iron or steel. The usual seal for such pipes is an O-ring, a packed gasket, poured liquid sealant which sets, etc. On aging and on higher pressures such gaskets begin to leak which further erodes the seal.

It is, therefore, an object of the invention to provide fluid-tight rubber gasket for concrete and other types of pipe with bell and spigot joints.

Another object of the invention is to provide a gasket which utilizes the pressure created by compressing rubber to obtain a leakproof, fluid-tight type of gasket.

A further object of the invention is to provide a combination gasket for pipe joints having a generally U-shaped portion and a rollable sleeve portion.

These and other objects and advantages of the invention may be readily ascertained by referring to the following description and appended illustrations in which.

Figure 1:
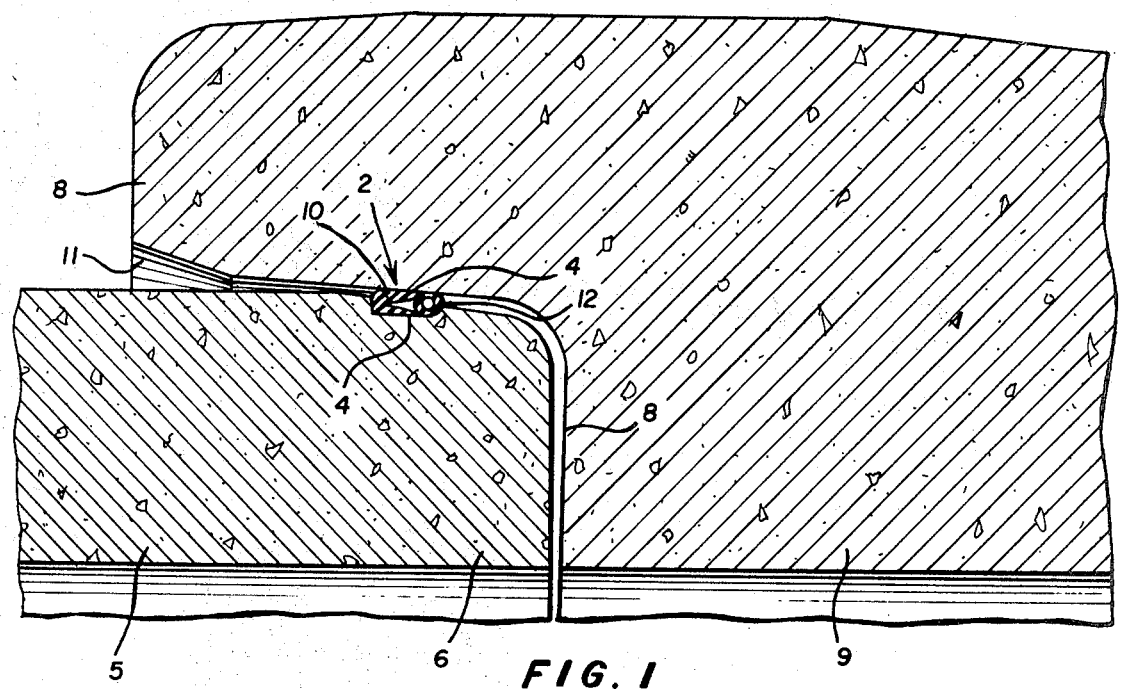
FIG. 1 is a side elevational detail, in cross-section of a rubber gasket, according to the invention, fitting in the groove of a concrete pipe joint.
Figure 2:
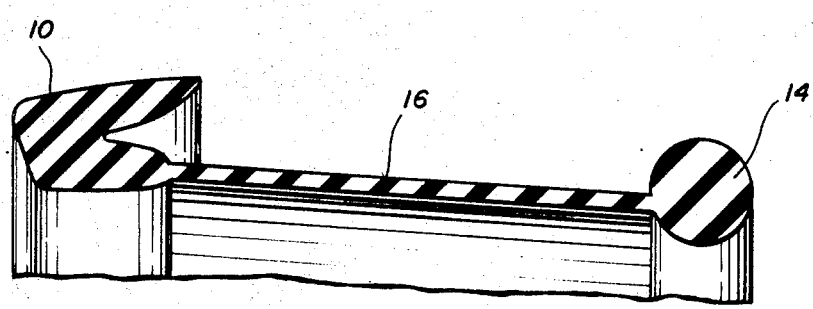
FIG. 2 is a side elevational, cross-sectional detail of an unrolled rubber gasket according to the invention.

In the device selected for illustration, a flexible, resilient gasket, shown in general by numeral 2, is fitted in gasket groove 4 in pipe 5 between its pipe spigot end 6 and pipe bell end 8 of pipe 9. The gasket includes an annular, generally U-shaped section 10 fitting in the gasket groove and against the inside of the bell forming a seal between the two pipes. A sleeve section 16 depends from one leg of the generally U-shaped section and terminates in a ring 14. The gasket is preferably made as a one piece gasket, however, may be made in three parts, i.e., the generally U-shaped section, the sleeve and the ring, and these parts sealed together. The gasket is preferably made of neoprene or other synthetic rubber, but may be made of other rubbers, both natural and synthetic rubbers or other flexible, resilient plastics. The material should be of a low durometer with high flexibility and resiliency. The length of the sleeve 16 is sufficient to fill the gap between pipes in a joint, when rolled up and abutting against the generally U-shaped section, to be compressed against and seal against both pipes.

The pipe to which the gasket is applicable may be made of concrete, cast iron or steel, or other materials. The gasket is, also, useful for joints other than bell and spigot ends on pipes where a gasket provides a seal in a space between the inside of one pipe and the outside of a telescoped end. The gasket may, also, seal pipe ends to various fittings such as L's, T's, etc.

For use, the gasket is placed on the spigot end of a pipe with the generally U-shaped section in the gasket groove and the ring nearest the pipe end. The pipes are assembled by telescoping one end into the other. As the spigot end of the pipe is inserted into the bell end of the other, the inside of the bell contacts the ring and rolls it back onto the sleeve. Further telescoping the pipes together rolls the sleeve around the ring until the pipes are fully telescoped together. When the joint is completely together the entire gasket is in the groove with both the generally U-shaped section and roll compressed against both pipes.

Figure 3:
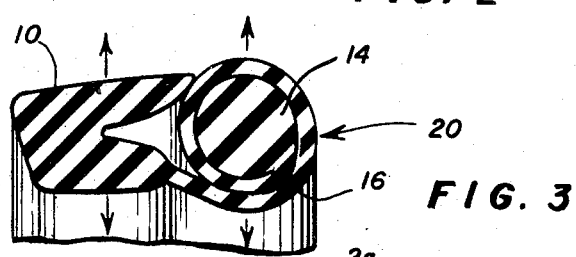
FIG. 3 is a side view of the rubber gasket of FIG. 2 rolled up in its sealing condition for a pipe joint.
Figure 4:
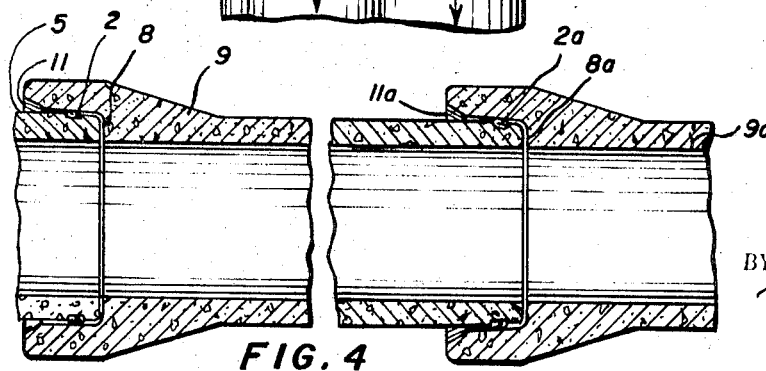
FIG. 4 is a sectional, partially schematic view of the rubber gasket according to the invention joining the ends of pipes in a line.

The section of pipe of FIG. 4 illustrates the use of the gaskets. The bell 8 of pipe 9 is telescoped over the spigot end of pipe 5, and the ring is initially started rolling by its contact with the flared opening 11 of bell. When the joint is complete both gaskets 2 and 2a are completely in the groove. Fluid pressure from the pipe is forced out the crack between the ends of the two pipes into contact with the gasket. The fluid under pressure is exerted against the rolled up sleeve generally along a line such as 20 in FIG. 3 compressing it against the open legs of the generally U-shaped portion forcing them wider apart into tighter contact with the bell and groove in the spigot end. The pressure, also, forces the rolled up sleeve and ring towards a flattened condition so that it presses against the bell and the spigot in a manner similar to the generally U-shaped. The gasket makes a water-tight joint substantially tighter than an ordinary O-ring or compressed gasket.

In an actual test of the gasket in pipe joints, a 48" concrete pipe was hydrostatically tested at more than 100 p.s.i. with no leakage. The gasket is, of course, readily adaptable to other sizes with excellent results.

While the invention has been illustrated by reference to a particular embodiment, there is no intent to limit the spirit or scope of the invention to the precise details so set forth, except as defined in the following claims.

I claim:
1. A gasket for sealing joints between pipes or the like comprising
   (a) a soft, resilient, annular generally U-shaped member having two diverging legs,
   (b) a soft, resilient sleeve depending from the inner of said two diverging legs and extending axially away therefrom,
   (c) and a ring depending from the end of said sleeve opposite said generally U-shaped member with said sleeve rolled around it contacting said generally U-shaped member and spreading the legs thereof outwardly.
2. A gasket according to claim 1 wherein said sleeve is integral with said generally U-shaped member.

3. A gasket according to claim 1 wherein said sleeve, generally U-shaped member and ring are an integral one-piece construction.

4. A gasket according to claim 1 wherein the inner leg of said generally U-shaped member is shorter than the outer leg.

5. A gasket according to claim 1 wherein the side of said generally U-shaped member opposite said legs is planar and arranged to seat against a radial wall of a groove on one pipe of said joint.

6. A gasket according to claim 1 wherein said generally U-shaped member, sleeve and ring are separately formed and then sealed together.

References Cited

UNITED STATES PATENTS

| | | | |
|---|---|---|---|
| 2,686,402 | 8/1954 | Samuel | 277—205X |
| 3,414,273 | 12/1968 | Sumner | 277—168X |

FOREIGN PATENTS

| | | | |
|---|---|---|---|
| 807,205 | 1/1959 | Great Britain | 277—207A |
| 1,094,054 | 12/1960 | Germany | 285—344 |

SAMUEL B. ROTHBERG, Primary Examiner

U.S. Cl. X.R.

277—190, 205, 207